(12) United States Patent
Chen et al.

(10) Patent No.: US 11,327,527 B2
(45) Date of Patent: May 10, 2022

(54) MOTOR ASSEMBLY AND ELECTRONIC DEVICE INCLUDING THE SAME

(71) Applicant: ASUSTeK COMPUTER INC., Taipei (TW)

(72) Inventors: Chui-Hung Chen, Taipei (TW); Cheng-Han Chung, Taipei (TW); Ching-Yuan Yang, Taipei (TW); Chia-Min Cheng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 162 days.

(21) Appl. No.: 16/811,069

(22) Filed: Mar. 6, 2020

(65) Prior Publication Data

US 2020/0285277 A1    Sep. 10, 2020

Related U.S. Application Data

(60) Provisional application No. 62/848,070, filed on May 15, 2019.

(30) Foreign Application Priority Data

Mar. 8, 2019  (TW) ................................. 108202840
Nov. 6, 2019  (TW) ................................. 108214698

(51) Int. Cl.
  *G06F 1/16*    (2006.01)
  *H04M 1/02*    (2006.01)
(52) U.S. Cl.
  CPC .......... *G06F 1/1624* (2013.01); *G06F 1/1686* (2013.01); *H04M 1/0237* (2013.01); *H04M 1/0264* (2013.01)

(58) Field of Classification Search
  CPC combination set(s) only.
  See application file for complete search history.

(56) References Cited

U.S. PATENT DOCUMENTS 4,063,716 A * 12/1977 Aitken, Jr. ............ B28C 5/1215
                                                        366/100
6,820,707 B1 * 11/2004 Cantemir ................ B60T 1/062
                                                         180/65.6
(Continued)

FOREIGN PATENT DOCUMENTS

CN          101303445 A     11/2008
CN          201945728 U      8/2011
(Continued)

*Primary Examiner* — Junpeng Chen
(74) *Attorney, Agent, or Firm* — McClure, Qualey & Rodack, LLP

(57) ABSTRACT

A motor assembly is provided. The motor assembly includes a motor, a driving force transmission module, and a driving force output component. The motor includes a rotating shaft, the rotating shaft is configured to rotate along a first axis. The driving force transmission module includes a first transmission portion and a second transmission portion connected with each other. The first transmission portion is connected with the rotating shaft of the motor, and the second transmission portion is bent relative to the first transmission portion and extends to one side of the motor. The driving force output component is connected with an end of the second transmission portion away from the first transmission portion, and configured to rotate along a second axis, which is parallel to the first axis.

8 Claims, 6 Drawing Sheets

(56) References Cited

U.S. PATENT DOCUMENTS

| | | | |
|---|---|---|---|
| 9,739,356 B1 * | 8/2017 | Bonny | F16H 39/06 |
| 9,998,642 B2 * | 6/2018 | Evans, V | H04N 5/2254 |
| 10,063,677 B2 | 8/2018 | Cavallaro et al. | |
| 10,070,030 B2 * | 9/2018 | Evans, V | G02B 13/0065 |
| 10,444,802 B2 * | 10/2019 | Zeng | H04M 1/0235 |
| 11,057,506 B2 * | 7/2021 | Zeng | H04M 1/02 |
| 2012/0092820 A1 | 4/2012 | Hautamaki et al. | |
| 2013/0296094 A1 | 11/2013 | Mack et al. | |
| 2014/0157966 A1 * | 6/2014 | Frolov | B23D 45/06 |
| | | | 83/477 |
| 2014/0305987 A1 * | 10/2014 | Parihar | A61B 17/1155 |
| | | | 227/175.2 |
| 2019/0124186 A1 * | 4/2019 | Zeng | H04M 1/0237 |
| 2019/0261991 A1 * | 8/2019 | Beckman | A61B 17/1155 |

FOREIGN PATENT DOCUMENTS

| | | |
|---|---|---|
| CN | 208143261 U | 11/2018 |
| EP | 3525436 B1 | 3/2021 |
| WO | 2014085483 A1 | 6/2014 |

* cited by examiner

MOTOR ASSEMBLY AND ELECTRONIC DEVICE INCLUDING THE SAME

CROSS-REFERENCE TO RELATED APPLICATION

This application claims the priority benefits of Taiwan application serial No. 108202840 filed on Mar. 8, 2019, Taiwan application serial No. 108214698 filed on Nov. 6, 2019, and U.S. provisional application No. 62/848,070 filed on May 15, 2019. The entirety of the above-mentioned patent applications are hereby incorporated by reference herein and made a part of specification.

BACKGROUND OF THE INVENTION

Field of the Invention

The invention relates to a motor assembly and an electronic device with the motor assembly.

Description of the Related Art

In recent years, full-screen display mobile phones are developed for a better user experience. While achieving full-screen display design, the internal space for placing kinds of functional modules in the mobile phone is compressed. Therefore, to configure functional modules in the internal space of the mobile phone effectively is one of the important topics.

BRIEF SUMMARY OF THE INVENTION

According to the first aspect, a motor assembly is provided. The motor assembly includes: a motor, including a rotating shaft, the rotating shaft is configured to rotate along a first axis; a driving force transmission module, including a first transmission portion and a second transmission portion connected with each other, the first transmission portion is connected with the rotating shaft of the motor, the second transmission portion is bent relative to the first transmission portion and extends to one side of the motor; and a driving force output component, connected with an end of the second transmission portion away from the first transmission portion, and configured to rotate along a second axis, the second axis is parallel to the first axis.

According to the second aspect, an electronic device is provided. The electronic device includes: a motor assembly, including: a motor, including a rotating shaft, the rotating shaft is configured to rotate along a first axis; a driving force transmission module, including a first transmission portion and a second transmission portion connected with each other, the first transmission portion is connected with the rotating shaft of the motor, the second transmission portion is bent relative to the first transmission portion and extends to one side of the motor; and a driving force output component, connected with an end of the second transmission portion away from the first transmission portion, and configured to rotate along a second axis, the second axis is parallel to the first axis; and a functional module, connected to the driving force output component, and configured to be driven by the driving force output component to rotate.

The motor assembly of the present disclosure utilizes an L-shaped driving force transmission module and the motor in a U-shaped structure to reduce the space occupied by the motor assembly, and provide sufficient output torque.

These and other features, aspects and advantages of the present invention will become better understood with regard to the following description, appended claims, and accompanying drawings.

DETAILED DESCRIPTION OF THE EMBODIMENTS

In order to make the description of the present disclosure more detailed and complete, reference may be made to the accompanying drawings and the various embodiments described below. In order to make the description of the present disclosure more detailed and complete, reference may be made to the accompanying drawings and the various embodiments described below. The following is a description of many practical details to provide a thorough understanding of the present disclosure. However, it should be understood by those of ordinary skill in the art that the present disclosure may be practiced without the details of one or more embodiments.

Figure 1:
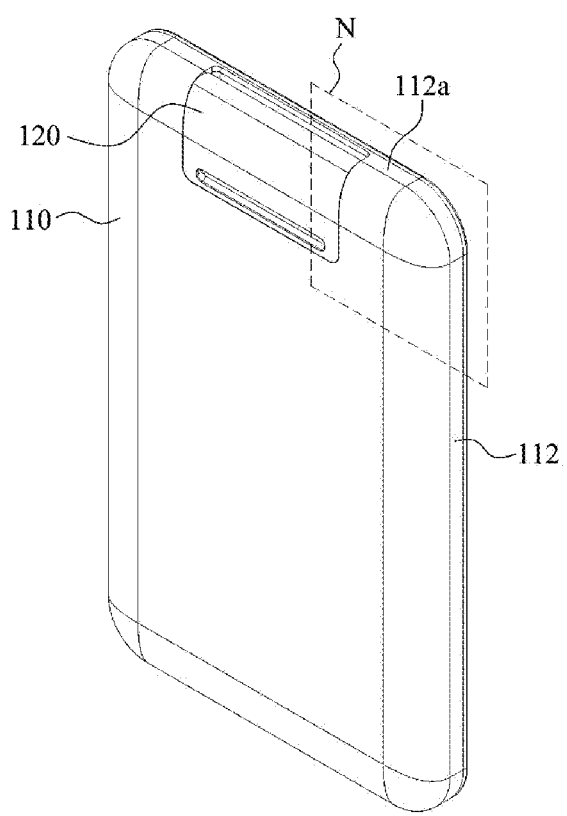
FIG. 1 and FIG. 2 are perspective views showing an electronic device in two different operating states according to an embodiment.
Figure 2:
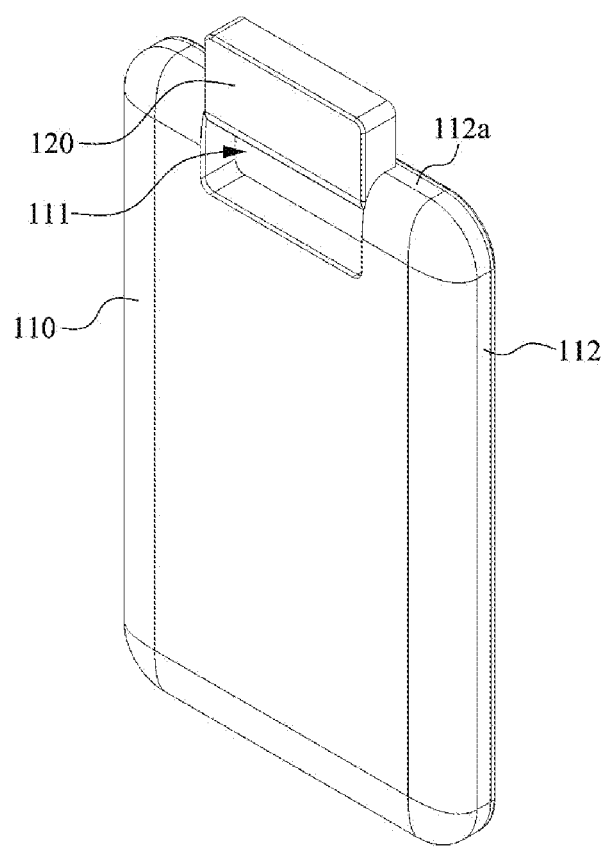

Please refer to FIG. 1 and FIG. 2, which are perspective views of the electronic device 100 in two different operating states according to an embodiment. The electronic device 100 includes a body 110 and a functional module 120. The body 110 has a groove 111, and the functional module 120 is rotatably disposed on the body 110. In an embodiment, the functional module 120 is received in the groove 111. In an embodiment, the functional module 120 rotates between a first position shown in FIG. 1 (the functional module 120 is in the groove 111) and a second position shown in FIG. 2 (the functional module 120 is extending to a side of the body 110). In some embodiments, the functional module 120 includes an image capture device or a speaker.

Figure 3:
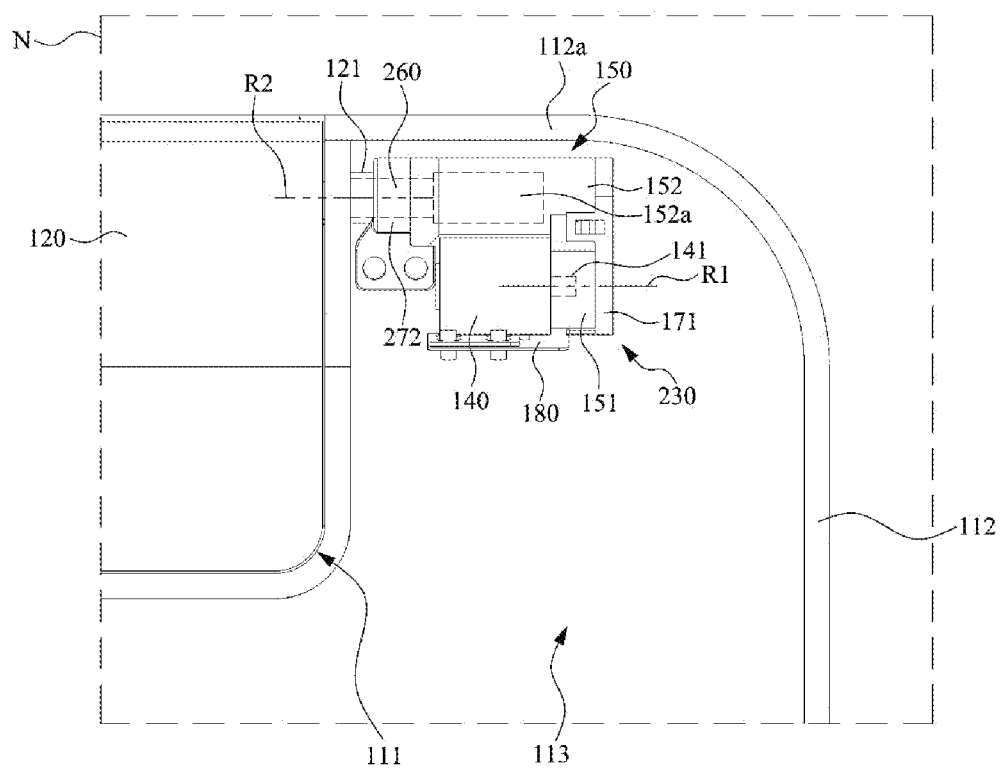
FIG. 3 is a partially enlarged side perspective view of the electronic device shown in FIG. 1 in a region N.

Please refer to FIG. 3, which is a partial enlarged side perspective view of the electronic device 100 shown in FIG. 1 in a region N. The electronic device 100 further includes a motor assembly 230, which is disposed in the body 110 and located near a side of the groove 111. The motor assembly 230 is connected to the functional module 120 and configured to drive the functional module 120 to rotate relative to the body 110.

As shown in FIG. 3, the body 110 further includes a frame 112 (also referred to as FIG. 1 and FIG. 2) and an accommodating space 113. The frame 112 extends along the outer edge of the body 110 and partially surrounds the accommodating space 113. The frame 112 includes a straight line segment 112a. The straight line segment 112a is parallel to the rotating shaft of the functional module 120 and connected to the groove 111. The motor assembly 230 is disposed in the accommodating space 113 and located on a side of the straight line segment 112a. In some embodiments, the straight line segment 112a is located on a short side of the electronic device 100.

As shown in FIG. 3, the motor assembly 230 includes a motor 140, a driving force transmission module 150, and a driving force output component 260. The motor 140 is a power source including a rotating shaft 141. In an embodiment, the rotating shaft 141 rotates around a first axis R1. The driving force transmission module 150 is connected between the motor 140 and the driving force output component 260. In an embodiment, the driving force transmission module 150 transmits the output of the motor 140 to the driving force output component 260. In some embodiments, the driving force transmission module 150 is a gearbox including a casing 150a and gears inside the casing 150a.

As shown in FIG. 3, the driving force transmission module 150 is substantially configured in L-shaped. Specifically, the driving force transmission module 150 includes a first transmission portion 151 and a second transmission portion 152 that are connected and substantially perpendicular to each other. The first transmission portion 151 is connected to the rotating shaft 141 of the motor 140, and the second transmission portion 152 is bent relative to the first transmission portion 151 and extending to one side of the motor 140. The motor 140 is located at a corner formed by bending the driving force transmission module 150, so that the motor 140 and the driving force transmission module 150 are arranged in a U-shaped structure. Since the short side of the electronic device 100 is partially occupied by the functional module 120, there is not enough space in the short side position to set a motor assembly in a general length. In the embodiment, the motor assembly 230 reduces the space occupied by the motor assembly 230 in the extending direction of the short side by configuring the driving force transmission module 150 to be L-shaped and arranging the motor 140 to be a U-shaped structure.

As shown in FIG. 3, the driving force output component 260 connects one end of the second transmission portion 152 away from the first transmission portion 151. In an embodiment, the driving force output component 260 rotates along the second axis R2 substantially parallel to the first axis R1. The functional module 120 is connected to the driving force output component 260. In an embodiment, the functional module 120 is driven to rotate by the driving force output component 260. In some embodiments, the functional module 120 rotates coaxially with the driving force output component 260, in other words, the functional module 120 also rotates along the second axis R2. In some embodiments, the functional module 120 includes a fixing part 121 with annular shape, and the fixing part 121 is fixedly sleeved on the driving force output component 260, so that the functional module 120 is firmly connected to the driving force output component 260.

As shown in FIG. 3, in some embodiments, the second transmission portion 152 includes a speed reduction mechanism 152a disposed in the casing 150a (the position of speed reduction mechanism 152a is not limited here) to increase the output torque of the motor assembly 230. When the motor assembly 230 has a large output torque, the upper limit of the weight of the functional module 120 is correspondingly increased, and the design flexibility of the functional module 120 is also increased (for example: high-strength materials are used as the outer casing, the functional module 120 accommodates more components to provide more functions, and the center of gravity of the functional module 120 is not limited to the rotating shaft). In some embodiments, the speed reduction mechanism 152a includes a planet gear set. In some embodiments, the driving force output component 260 is fixedly coupled to the output shaft (not shown) of the speed reduction mechanism 152a.

Figure 4:
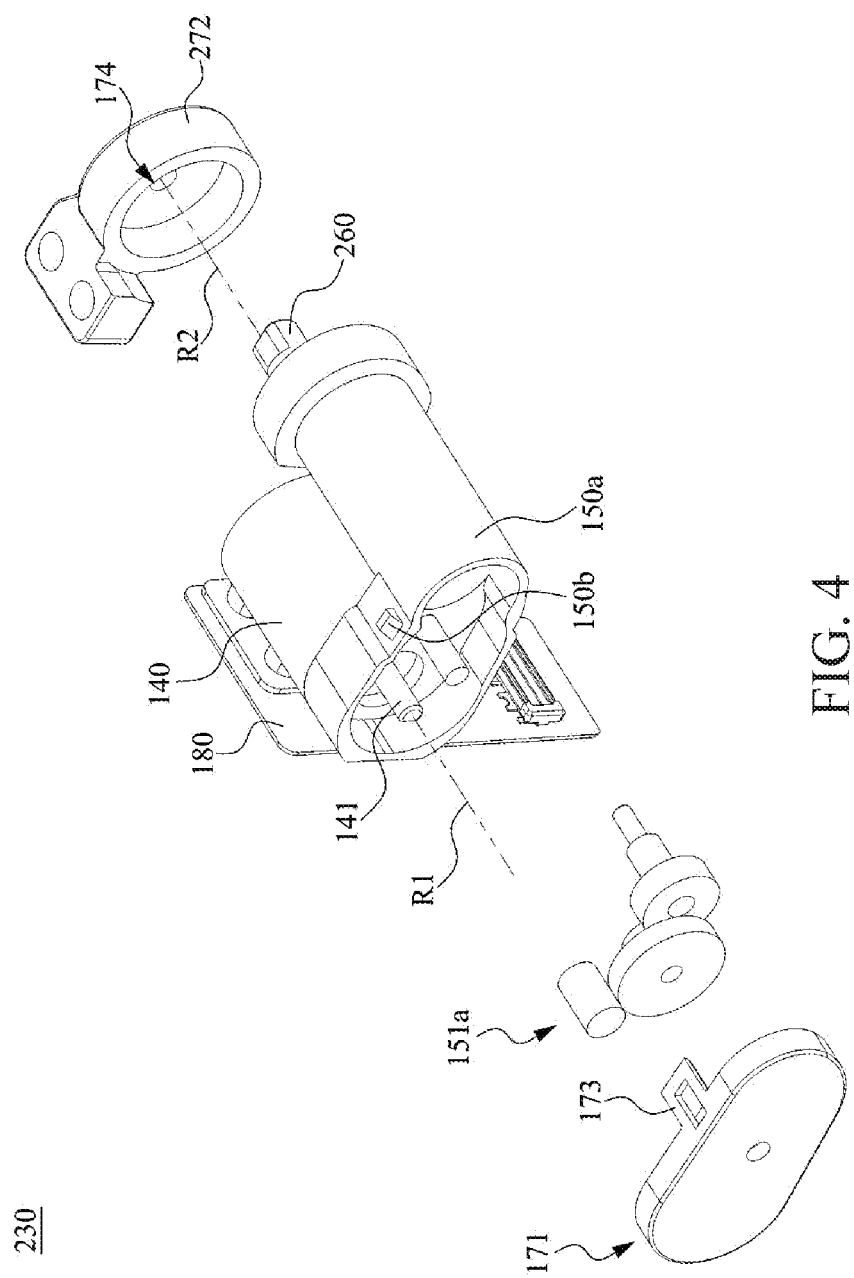
FIG. 4 is an exploded view of a motor assembly of the electronic device shown in FIG. 1.

Please refer to FIG. 4. In some embodiments, the first transmission portion 151 includes a gear set 151a. The gear set 151a includes a plurality of gears linked to each other. The gears of the gear set 151a are sequentially arranged away from the first axis R1, wherein one of the gears is fixedly sleeved on the rotating shaft 141 of the motor 140, and another gear is connected to the speed reduction mechanism 152a. In an embodiment, the rotating shafts of these gears are parallel to each other. In another embodiment, the rotating shafts of these gears are perpendicular to each other. In some embodiments, the gears of the gear set 151a are compound gears or bevel gears.

As shown in FIG. 4, in some embodiments, the motor assembly 230 further includes a first cover 171 and a second cover 272, which are configured to provide protection to internal components of the driving force transmission module 150 and the driving force output component 260. The first cover 171 includes a buckle 173, and the casing 150a of the driving force transmission module 150 includes a bump 150b. The first cover 171 is fixed to the casing 150a of the driving force transmission module 150 by engaging the bump 150b with the buckle 173. In an embodiment, the first cover 171 covers the gear set 151a of the first transmission portion 151. The second cover 272 with an opening 174 is provided at an end of the second transmission portion 152 away from the first transmission portion 151. The driving force output component 260 is partially exposed through the opening 174 to connect the functional module 120, and the remaining part of the output component 260 is covered and protected by the second cover 272.

As shown in FIG. 4, in an embodiment, the motor assembly 230 further includes a circuit board 180 electrically connected to the motor 140. The motor 140 is configured to receive signals (such as control signals from a processor or other controller of the electronic device 100) via the circuit board 180, and the motor 140 is activated in response to the signals. The motor 140 drives the driving force output component 260 to rotate through the driving force transmission module 150, and further drives the functional module 120 to rotate. In an embodiment, the circuit board 180 and the motor 140 are connected by welding. In some embodiments, the circuit board 180 is a flexible printed circuit board (FPC), a high density circuit board (high density circuit) board), or a printed the circuit board (PCB).

Figure 5:
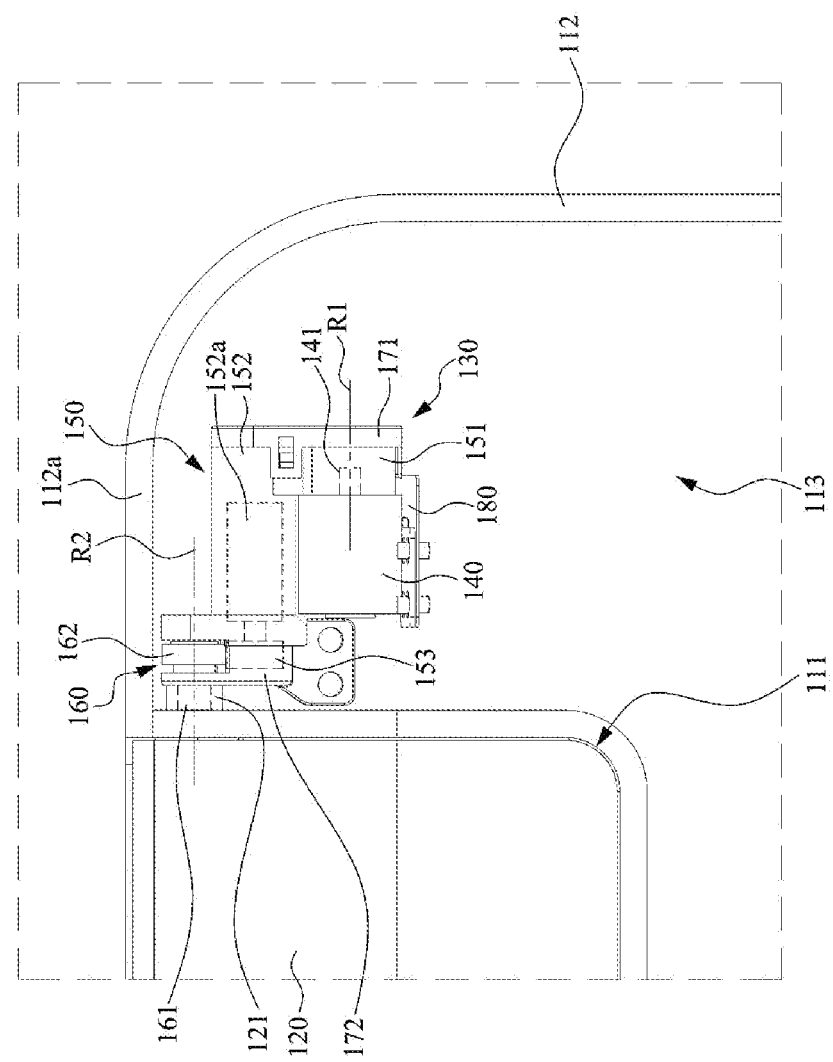
FIG. 5 is a partially enlarged side perspective view of the electronic device according to an embodiment.
Figure 6:
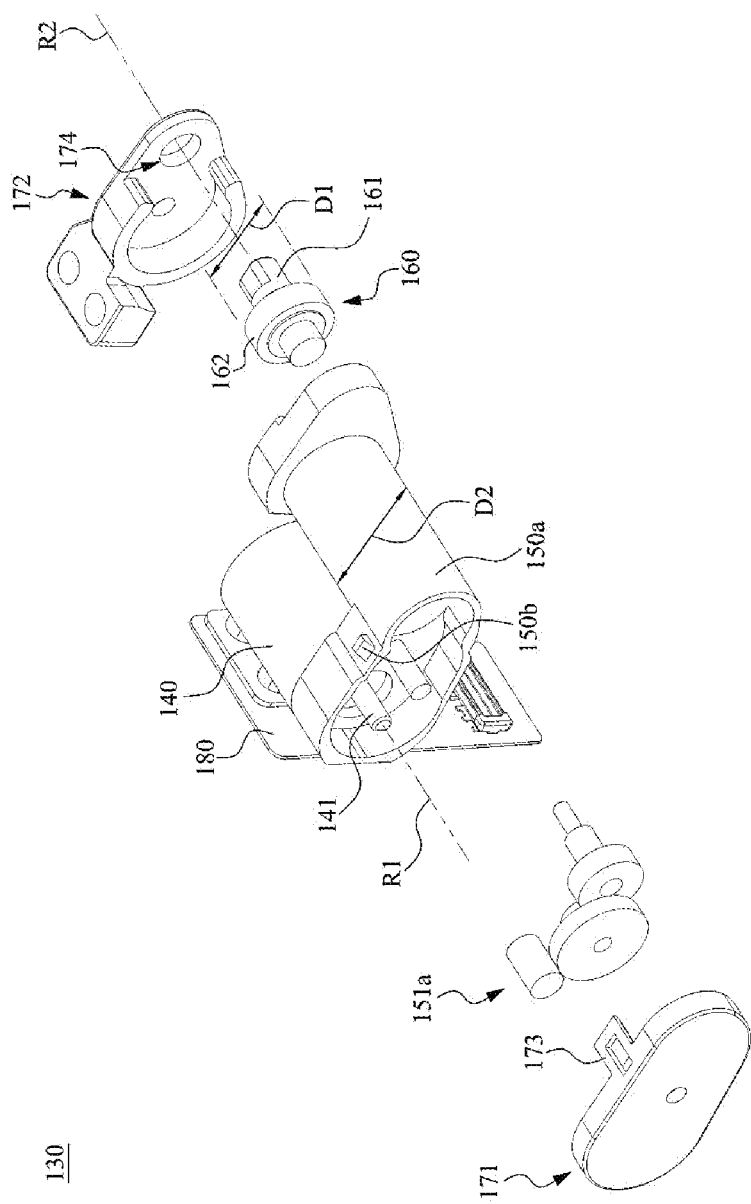
FIG. 6 is an exploded view of the motor assembly of the electronic device shown in FIG. 5.

Please refer to FIG. 5 and FIG. 6. When the second axis R2 is closer to the straight line segment 112a of the frame 112, the space required for the functional module 120 to rotate is smaller, and therefore the groove 111 can also be designed smaller, which is beneficial to the thinness of the electronic device. At the same time, in order to provide sufficient output torque to provide a sufficient reduction ratio, the size of the second transmission portion 152 cannot be designed too small. Therefore, in an embodiment, the driving force output component 160 is smaller than the second transmission portion 152 in the radial dimension, and the driving force output component 160 is closer to the straight line segment 112a of the frame 112 than the second transmission portion 152.

Specifically, as shown in FIG. 5, the second transmission portion 152 includes an output gear 153 (which is obstructed and represented by a dotted line, and is taken as the output of the speed reduction mechanism 152a). The rotating shaft of the output gear 153 is parallel to the first axis R1 (that is, the rotating axis of the motor 140 of the rotating shaft 141) and the second axis R2 (that is, the rotating axis of the driving force output component 160). The driving force output component 160 includes a gear portion 162, and the gear portion 162 engages with the output gear 153. The output gear 153 of the second transmission portion 152 is located between the first axis R1 (through the rotating shaft 141 of the motor 140) and the second axis R2 (through the driving force output component 160). In other words, when the motor assembly 130 is disposed on the body 110, the driving force output component 160 is located between the output gear 153 of the second transmission portion 152 and the straight line segment 112a of the frame 112 (which connects with the groove 111 and extends substantially parallel to the first axis R1). As shown in FIG. 6, the driving diameter D1 of the gear portion 162 of the driving force output component 160 is smaller than the outer diameter D2 of the second transmission portion 152. In this way, the second axis R2 is close to the frame 112, the space required for the functional module 120 to rotate is reduced, and the second transmission portion 152 is not limited by the position of the frame 112 to compress its volume, so as to provide enough reduction ratio.

As shown in FIG. 5, in some embodiments, the driving force output component 160 also includes a shaft portion 161, the fixing part 121 of the functional module 120 is fixedly sleeved on the shaft portion 161 of the driving force output component 160, which makes the functional module 120 to firmly connect with the driving force output component 160. As shown in FIG. 6, in some embodiments, the second cover 172 of the motor assembly 130 is disposed at an end of the second transmission portion 152 away from the first transmission portion 151. In addition, the second cover 172 covers the output gear 153 and a part of the driving force output component 160. The second cover 172 has the opening 174. The shaft portion 161 of the driving force output component 160 is partially exposed through the opening 174 to connect to the functional module 120, and the remaining part of the shaft portion 161 is covered and protected by the second cover 172.

In summary, the motor assembly of the disclosure utilizes an L-shaped driving force transmission module and the motor in a U-shaped structure to reduce the space occupied by the motor assembly and provide sufficient output torque.

Although the disclosure has been described in considerable detail with reference to certain preferred embodiments thereof, but it is not for limiting the scope of the disclosure. Persons having ordinary skill in the art may make various modifications and changes without departing from the scope. Therefore, the scope of the appended claims should not be limited to the description of the preferred embodiments described above.

What is claimed is:

1. A motor assembly, comprising:
   a motor, including a rotating shaft, the rotating shaft is configured to rotate along a first axis;
   a driving force transmission module, including a first transmission portion and a second transmission portion connected with each other, the first transmission portion is connected with the rotating shaft of the motor, the second transmission portion is bent relative to the first transmission portion and extending to one side of the motor; and
   a driving force output component, connected with an end of the second transmission portion away from the first transmission portion, and configured to rotate along a second axis, wherein the second axis is parallel to the first axis;
   wherein the first transmission portion comprises a plurality of gears linking-up with each other, and the second transmission portion comprises a speed reduction mechanism, wherein the first transmission portion and the second transmission portion form an L-shaped structure, the motor is located on a concave side of the L-shaped structure, such that the first transmission portion and the second transmission portion cover two neighboring sides of the motor respectively.

2. The motor assembly according to claim 1, wherein the motor and the driving force transmission module are arranged in a U-shaped structure.

3. The motor assembly according to claim 1, wherein the second transmission portion further includes an output gear, the driving force output component includes a gear portion, the gear portion is engaged with the output gear, and the output gear is located between the first axis and the second axis.

4. The motor assembly according to claim 3, wherein an outer diameter of the gear portion of the driving force output component is less than an outer diameter of the second transmission portion.

5. The motor assembly according to claim 1, wherein one of the gears is fixedly sleeved to the rotating shaft of the motor, and other one of the gears is connected to the speed reduction mechanism.

6. The motor assembly according to claim 1, further comprising:
   a circuit board, electrically connected to the motor, wherein the motor assembly is configured to receive a signal by the circuit board and drive the driving force output component to rotate by the driving force transmission module in response to the signal.

7. An electronic device, comprising:
   a motor assembly, including:
   a motor, including a rotating shaft, the rotating shaft is configured to rotate along a first axis;
   a driving force transmission module, including a first transmission portion and a second transmission portion connected with each other, the first transmission portion is connected with the rotating shaft of the motor, the second transmission portion is bent relative to the first transmission portion and extends to one side of the motor; and
   a driving force output component, connected with an end of the second transmission portion away from the first transmission portion, and configured to rotate along a second axis, wherein the second axis is parallel to the first axis; and
   a functional module, connected to the driving force output component, and the functional module is driven to rotate by the driving force output component;
   wherein the first transmission portion comprises a plurality of gears linking-up with each other, and the second transmission portion comprises a speed reduction mechanism, wherein the first transmission portion and the second transmission portion form an L-shaped structure, the motor is located on a concave side of the L-shaped structure, such that the first transmission portion and the second transmission portion cover two neighboring sides of the motor respectively.

8. The electronic device according to claim 7, further comprising:
   a body, including a frame and a groove, the groove is configured to receive the functional module, the frame includes a straight line segment, the straight line segment extends parallel to the first axis and connecting the groove, wherein the second transmission portion further includes an output gear, the driving force output component includes a gear portion, the gear portion is engaged with the output gear, and the driving force output component is located between the output gear and the straight line segment.

\* \* \* \* \*